United States Patent
Kida et al.

[11] 3,918,326
[45] Nov. 11, 1975

[54] BALANCER WITH FLEXIBLE GEAR TO MOVE WEIGHT

[75] Inventors: Kihachi Kida, Tokyo; Takahiro Akane, Tokorozawa; Satosi Hosoe; Tadashi Sugita, both of Tokyo, all of Japan

[73] Assignee: Kabushiki Kaisha Hasegawa Haguruma, Tokyo, Japan

[22] Filed: Oct. 16, 1973

[21] Appl. No.: 406,958

[30] Foreign Application Priority Data
Sept. 8, 1972  Japan.................. 47-90099

[52] U.S. Cl. .................. 74/573; 51/169; 74/640; 74/805
[51] Int. Cl.² .................. F16F 15/10; F16H 35/00
[58] Field of Search .......... 74/573, 640, 800, 804, 74/805; 51/169

[56] References Cited
UNITED STATES PATENTS

| | | | |
|---|---|---|---|
| 2,241,637 | 5/1941 | Ernst et al. | 74/573 X |
| 3,177,738 | 4/1965 | Achilles | 74/573 |
| 3,241,395 | 3/1966 | Voller et al. | 74/573 |
| 3,339,430 | 9/1967 | Klein | 74/573 |
| 3,482,770 | 12/1969 | Nelson | 74/640 X |
| 3,702,082 | 11/1972 | Decker | 74/573 |

*Primary Examiner*—Samuel Scott
*Assistant Examiner*—John Reed

[57] ABSTRACT

A balancer has a casing rotatable with a wheel such as a grinding wheel and an intermediate body housed in the casing, the casing and the body having inner gears which engage flexible gears adopted to be deformed by wave generators, whereby producing a relative rotation between the inner gears and regulating an eccentric mass of the rotating wheel so as to prevent the vibration caused by said eccentric mass.

5 Claims, 3 Drawing Figures

BALANCER WITH FLEXIBLE GEAR TO MOVE WEIGHT

BACKGROUND OF THE INVENTION

1. Field of the Invention

The present invention relates to a balancer for counterbalancing an eccentric mass of a rotating machine such as a grinder, particularly to a balancer capable of preventing a vibration caused by an eccentric mass of a rotating wheel without any interruption of working operation to prevent such a vibration of the rotating wheel.

2. Description of the Prior Art

Hitherto, it has been common to apply a balancing weight at a suitable place of a rotating wheel having an eccentric mass so as to prevent vibration of the wheel caused by the eccentric mass thereof. However, it has been necessary to repeatedly carry out a troublesome operation in order to find out the suitable place for applying the weight to regulate the vibration of the wheel when the latter is running at a high-speed of rotation. Further, certain prior balancers have the defect that it is impossible to perform the above operation during the running of the wheel. Although the balancer able to carry out the above operation during the running of the wheel has been developed, this type of prior art balancer requires inconvenient operations and has a complicated structure when designed to be housed in a restricted space. Therefore, this prior art balancer has defects that make it difficult to obtain an accuracy of regulation for preventing the vibration of the wheel and reducing the manufacturing cost.

BRIEF SUMMARY OF INVENTION

According to the present invention, the several defects of the prior art balancers have been overcome and there is provided a balancer comprising a cylindrical casing having a device adapted to be fixed to a machine to be rotated, a first inner gear secured to said casing, an intermediate member housed in said casing, a second inner gear secured to said intermediate member, and first means for producing a relative rotation between said first and second inner gears, an eccentric mass of said rotating machine being regulated by movement of a weight caused by said relative rotation of said inner gears.

It is a primary object of this invention to provide a balancer able to regulate an eccentric mass of a running machine during an operation thereof and prevent the vibration thereof caused by the eccentric mass.

It is another object of this invention to provide a balancer able to regulate an eccentric mass of a running machine by a easy operation and having a simple structure.

It is further object of this invention to provide a balancer which has inner gears secured to a rotatable casing and an intermediate member housed in the casing, whereby to prevent the vibration of the machine by producing a relative rotation between the inner gears and shifting the weights relative to the casing.

Other objects and advantages of this invention will become apparent from the following specification, drawings and appended claims.

DETAILED DESCRIPTION OF INVENTION

Figure 1:
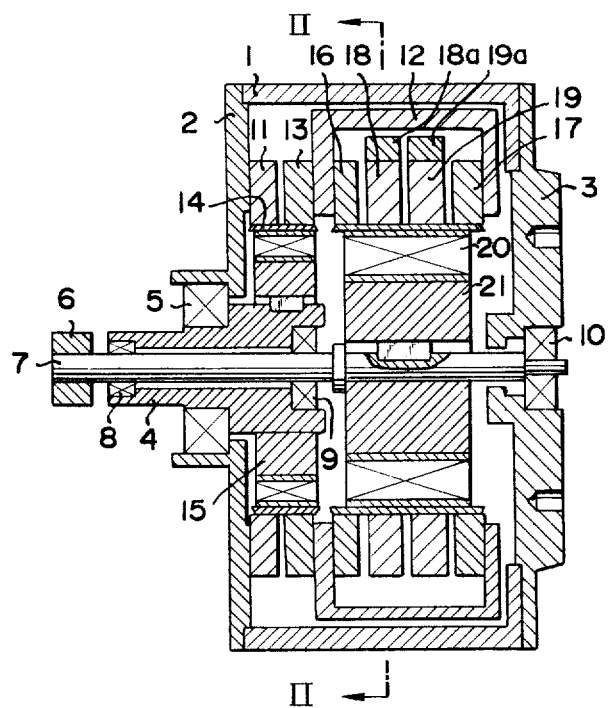
FIG. 1 is a longitudinal sectional view of a balancer embodying a principle of this invention.
Figure 2:
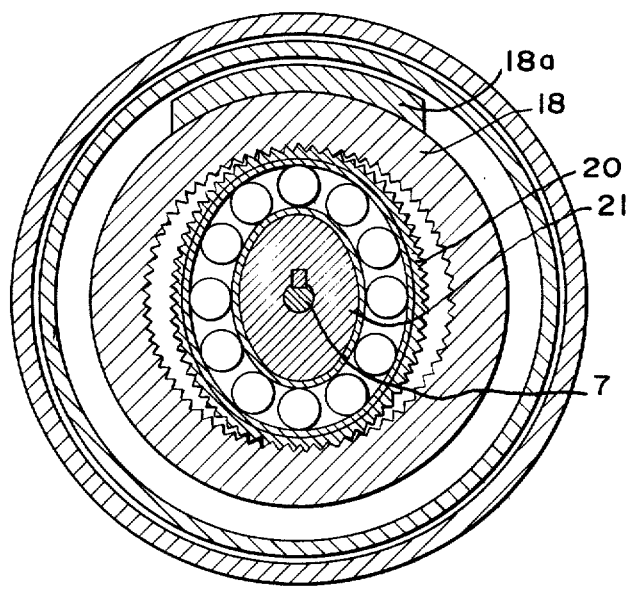
FIG. 2 is a sectional view taken on line II—II of FIG. 1.

Referring now to the drawings, a housing or casing has a cylindrical body 1 and end plates 2, 3 fixed to both extremities of the body. The end plate 3 serves to secure a balance of the present invention to a machine to be rotated. Thus, when the machine starts to rotate, the casing may be rotated. A hollow member 4 passes through the end plate 2 and is supported on the end plate 2 by a bearing and an oil seal 5 to allow the rotation of the member 4 and also application of a suitable brake action to the member 4. The other end plate 3 bears a shaft 7 arranged to pass through the interior of the hollow member 4. A knob 6 is secured to one end portion of the shaft 7. The shaft 7 is supported on the hollow member 4 and the end plate 3 by bearings and oil seals 8, 9, 10 to allow the rotation of the shaft 7 and application of suitable brake action to the shaft 7.

The end plate 2 is provided at its inner surface with an inner gear 11. An intermediate body member 12 is housed in the casing, which member has a second internal gear 13 having a number of teeth different from that of the first gear 11. The second internal gear and the first gear are located in parallel. A flexible gear 14 is disposed to engage the first and second gears 11, 13 when the gear 14 is deformed into an elliptical form by an ellipse-shaped wave generator 15 secured to the hollow member 4. The wave generator and the flexible gear are arranged to allow relative rotation between them.

A pair of third internal gears 16, 17 are fixed to the internal surfaces of the intermediate member 12 and have the same number of teeth as each other. Fourth internal gears 18, 19 are disposed between the gears 16, 17 and in a row. The numbers of teeth of the fourth gears 18, 19 are different from that of the gears 16, 17 and each gear 18 or 19 has a different number of teeth, respectively. The gear 18 is provided with a weight 18a and the gear 19 is provided with a weight 19a. A second flexible gear 20 is disposed to engage the gears 16, 17, 18, 19 when the gear 20 is deformed in an elliptical form by an ellipse-shaped wave gererator 21 fixed to the shaft 7.

The balancer assembled according to the above rotates, when the machine rotates. When an eccentric mass of the rotating machine causes vibration of the rotating machine, the hollow member 4 first grasped so that the wave generator 15 may start to rotate relatively to the flexible gear 14. This relative rotation allows to shift the deflection of the flexible gear 14 and the point of contact of the gear 11 and the gear 13 in the circumferential direction. As the number of teeth of the inner gear 11 is different from that of the inner gear 13, relative rotation is caused between the inner gear 11 and the inner gear 13 by movement of said point of contact. Thus, the positions of the weights 18a, 19a relative to the casing are changed. Second, the shaft 7 is grasped so that shift of the point of contact is produced between the flexible gear 20 and the inner gears 16, 17, 18, 19 to restrain the vibration of the machine.

If the numbers of teeth of the gears 16, 17, 18, 19 relative to those of the flexible gear 20 are properly selected, the inner gears 18, 19 having the weights 18a, 19a can be properly rotated.

For example, if the number of teeth of the inner gear 18 is the same as that of the flexible gear 20, the numbers of teeth of the inner gears 16, 17 are more than that of the inner gear 18 by two and the number of teeth of the inner gear 19 is more than that of the flexible gear 20 by four, the gears 18, 19 will be rotated at substantially the same speed and in the opposite direction to the inner gears 16, 17. Thus, the position of each weight will be changed so that the composition of the eccentric mass of both the weights may be regulated.

The inner gears 16, 17, 18, 19 do not necessarily engage a single flexible gear. It will be preferable to divide the flexible gear into two sections and cut the suitable number of teeth thereon.

Figure 3:
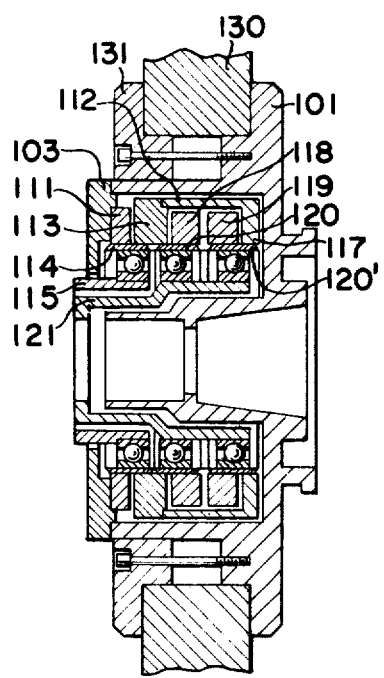
FIG. 3 is a longitudinal sectional view of a grinder embodying a principle of this invention.

FIG. 3 shows an embodiment of a grinding machine embodying a principle of the present invention. In this embodiment, a grinding wheel 130 is secured by a fastener such as a bolt between a casing 101 and a corresponding annular member 131, and a balancer according to the present invention is housed in an annular recess formed on one side surface of the casing 101. An inner gear 111 fixed to the casing 101 engages a flexible gear 114. An inner gear 113 secured to an intermediate member 112 engages both flexible gear 114 and 120 and also an inner gear 117 formed on the intermediate member 112 engages a flexible gear 120'. Further, inner gears 118, 119 having weights engage flexible gears 120, 120' and a flexible gear 114 is positioned to be resiliently deformed by a wave generator 115. The flexible gears 120, 120' are arranged to be deformed by a wave generator 121. For example, it is possible that the numbers of teeth of the flexible gears 120, 120' are the same as each other, that the numbers of teeth of the inner gears 113, 119 are the same as each other and more than those of the flexible gear 120, 120' by two, and that the numbers of teeth of the inner gears 117, 118 are the same as each other and more than those of the flexible gears 120, 120' by four. The relation of the numbers of teeth of the inner gears and the flexible gears does not necessarily follow the above example, but as required to cause relative rotation between the inner gears.

As apparent from the above, the balancer according to the present invention can accomplish an exact regulation of the unbalance of a rotating machine in its mass by a simple operation. Further, the balancer can be incorporated in a space used to house the prior art balancer.

Many other embodiments will be apparent to those skilled in the art, and, therefore, this invention is to be limited only to the extent specified in the appended claims.

What we claim is:

1. A balancer for regulating an eccentric mass of a machine to be rotated comprising a cylindrical casing having a device adapted to be fixed to the machine, a first inner gear secured to said casing, an intermediate member housed in said casing, a second inner gear secured to said intermediate member, a weight associated with said intermediate member, and first means for producing a relative rotation between said first and second inner gears comprising a flexible gear engaging said first and second inner gears, a wave generator in elliptical form for deflecting said flexible gear, and a shaft keyed to said wave generator, to cause movement of said weight relative to said casing.

2. A balancer for regulating an eccentric mass of a machine to be rotated comprising a cylindrical casing having a device adapted to be fixed to the machine, a first inner gear secured to said casing, an intermediate member housed in said casing, a second inner gear secured to said intermediate member, a weight associated with said intermediate member, first means for producing a relative rotation between said first and second inner gears to cause movement of said weight relative to said casing, and second means arranged in parallel with said first means, said first and second means comprising flexible gears, one of said flexible gears engaging said first and second gears, and there is provided third and fourth inner gears secured to said intermediate member and engaging the other flexible gear.

3. A balancer of claim 2, wherein said second means has fifth and sixth inner gears positioned between said third and fourth gears and engaging said other flexible gear, and said fifth and sixth inner gears having weights thereon.

4. A balancer of claim 3 wherein the number of teeth of said first gear is different from that of said second gear, the numbers of teeth of said first and second gears being the same as those of said third and fourth gears, and the numbers of teeth of said fifth and sixth gears being different from those of said third and fourth gears, and said fifth and sixth gears having different numbers of teeth, respectively.

5. A balancer for regulating an eccentric mass of a machine to be rotated comprising a cylindrical casing having a device adapted to be fixed to the machine, a first inner gear secured to said casing, an intermediate member housing in said casing, a second inner gear secured to said intermediate member, a weight associated with said intermediate member, first means for producing a relative rotation between said first and second inner gears to cause movement of said weight relative to said casing, second and third means located in parallel with said first means, said first, second and third means comprising flexible gears, a third gear formed integral with said second gear, a fourth gear secured to said intermediate member, and fifth and sixth gears having weights thereon between said third and fourth gears, said integral gear engaging the flexible gear of said first means, the flexible gear of said second means engaging said integral gear and said fifth gear, the flexible gear of said third means engaging said sixth and fourth gears, and two of said means being secured to a common shaft.

* * * * *